(12) United States Patent
Millar

(10) Patent No.: US 9,648,706 B2
(45) Date of Patent: May 9, 2017

(54) SYSTEMS AND METHODS FOR CUSTOMIZED LOAD CONTROL

(71) Applicant: Earth Star Solutions, LLC, Eagle Mountain, UT (US)

(72) Inventor: Gary Bret Millar, Highland, UT (US)

(73) Assignee: Earth Star Solutions, LLC, Eagle Mountain, UT (US)

( * ) Notice: Subject to any disclaimer, the term of this patent is extended or adjusted under 35 U.S.C. 154(b) by 0 days.

(21) Appl. No.: 15/093,430

(22) Filed: Apr. 7, 2016

(65) Prior Publication Data

US 2016/0302274 A1 Oct. 13, 2016

Related U.S. Application Data

(60) Provisional application No. 62/144,070, filed on Apr. 7, 2015.

(51) Int. Cl.
| | | |
|---|---|---|
| G05F 1/66 | (2006.01) | |
| H05B 33/08 | (2006.01) | |
| G05B 15/02 | (2006.01) | |
| H05B 37/02 | (2006.01) | |

(52) U.S. Cl.
CPC ......... *H05B 37/0263* (2013.01); *G05B 15/02* (2013.01); *G05F 1/66* (2013.01); *H05B 33/0842* (2013.01)

(58) Field of Classification Search
CPC .. H04B 3/54; H04B 2203/5412; H04B 3/542; H04B 2203/5416; H04B 1/0475; H04B 2203/542; H04B 14/026; H04L 27/361; H05B 37/0263; H05B 33/0806; H05B 37/0254

See application file for complete search history.

(56) References Cited

U.S. PATENT DOCUMENTS

| | | | |
|---|---|---|---|
| 5,166,549 A | 11/1992 | DeDoncker | |
| 6,297,724 B1 | 10/2001 | Bryans et al. | |
| 6,950,010 B2 * | 9/2005 | Aisa ................... | H02J 13/0048 340/12.37 |
| 7,265,654 B1 * | 9/2007 | Lester ................. | H02J 13/0024 340/12.32 |
| 7,405,652 B2 * | 7/2008 | Hair, III .................. | H04B 3/54 340/12.32 |
| 7,498,935 B2 * | 3/2009 | Kodama .................. | H04B 3/54 340/12.32 |

(Continued)

OTHER PUBLICATIONS

International Search Report & Written Opinion mailed Jun. 24, 2016 for International Application No. PCT/US2016/026421 filed Apr. 7, 2016.

(Continued)

*Primary Examiner* — Vibol Tan
(74) *Attorney, Agent, or Firm* — Dinsmore & Shohl LLP

(57) ABSTRACT

Included are embodiments for customized load control. One embodiment of a method includes receiving altered alternating current power, where the altered alternating current power is altered via inclusion of a delay to communicate a message, converting the message in the altered alternating current power into a computer-readable format, and determining an action to take related to the message. Some embodiments include utilizing the altered alternating current power for performing the action, based on the message.

14 Claims, 9 Drawing Sheets

(56) References Cited

U.S. PATENT DOCUMENTS

| | | | | |
|---|---|---|---|---|
| 7,514,813 | B2* | 4/2009 | McKelvey | H02J 3/46 |
| | | | | 307/32 |
| 7,734,263 | B2* | 6/2010 | Maeda | H04B 1/0475 |
| | | | | 330/125 |
| 7,800,491 | B2* | 9/2010 | Kodama | H04B 3/54 |
| | | | | 340/12.32 |
| 8,130,085 | B2* | 3/2012 | Noh | H04B 3/54 |
| | | | | 340/12.32 |
| 8,179,231 | B1 | 5/2012 | Varahramyan et al. | |
| 8,427,300 | B2* | 4/2013 | Covaro | H03K 7/08 |
| | | | | 340/12.32 |
| 8,988,248 | B2* | 3/2015 | Beck | H04B 3/54 |
| | | | | 235/380 |
| 9,161,398 | B2* | 10/2015 | Millar | H05B 33/0806 |
| 9,276,633 | B2* | 3/2016 | Chen | H04B 3/542 |
| 2004/0004468 | A1 | 1/2004 | Dearn et al. | |
| 2006/0187101 | A1 | 8/2006 | Stadtherr | |
| 2008/0192512 | A1 | 8/2008 | Zheng et al. | |
| 2008/0278296 | A1 | 11/2008 | Noh | |
| 2009/0282452 | A1 | 11/2009 | Wei | |
| 2011/0043124 | A1 | 2/2011 | Johnston et al. | |
| 2011/0082599 | A1 | 4/2011 | Shinde et al. | |
| 2011/0291583 | A1 | 12/2011 | Shen | |
| 2012/0306287 | A1 | 12/2012 | Kim et al. | |
| 2014/0191574 | A1 | 7/2014 | Palatini | |
| 2014/0254200 | A1 | 9/2014 | Kuo | |
| 2016/0302287 | A1* | 10/2016 | Millar | H05B 37/0263 |

OTHER PUBLICATIONS

Office Action pertaining to U.S. Appl. No. 14/012,957 dated Oct. 29, 2015.
Non-Final Office Action mailed Oct. 4, 2016 for U.S. Appl. No. 15/093,438. pp. 1-10.

* cited by examiner

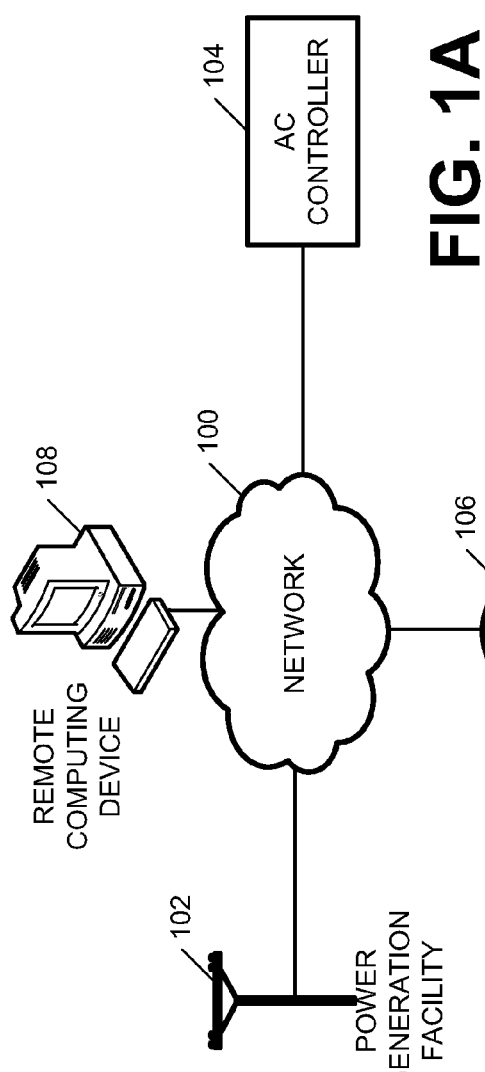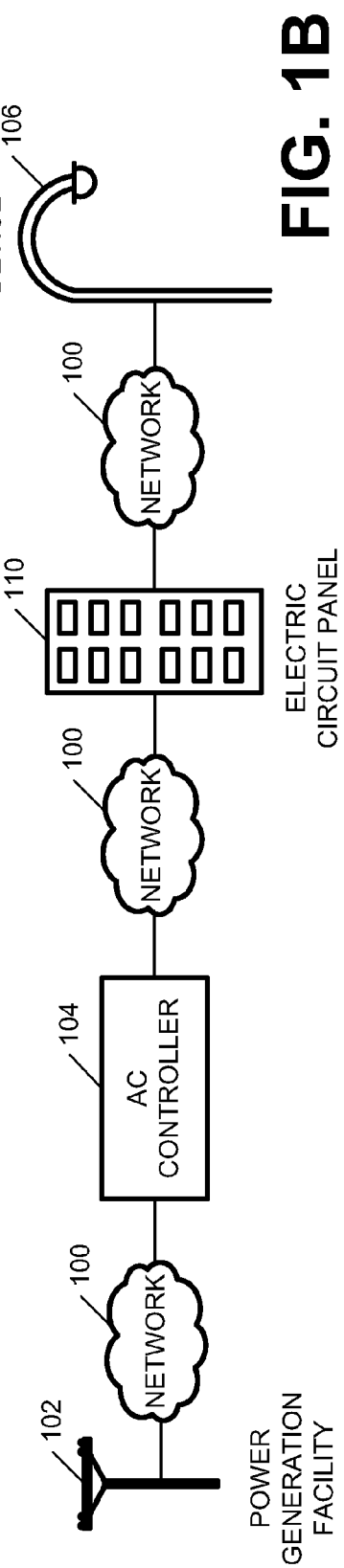

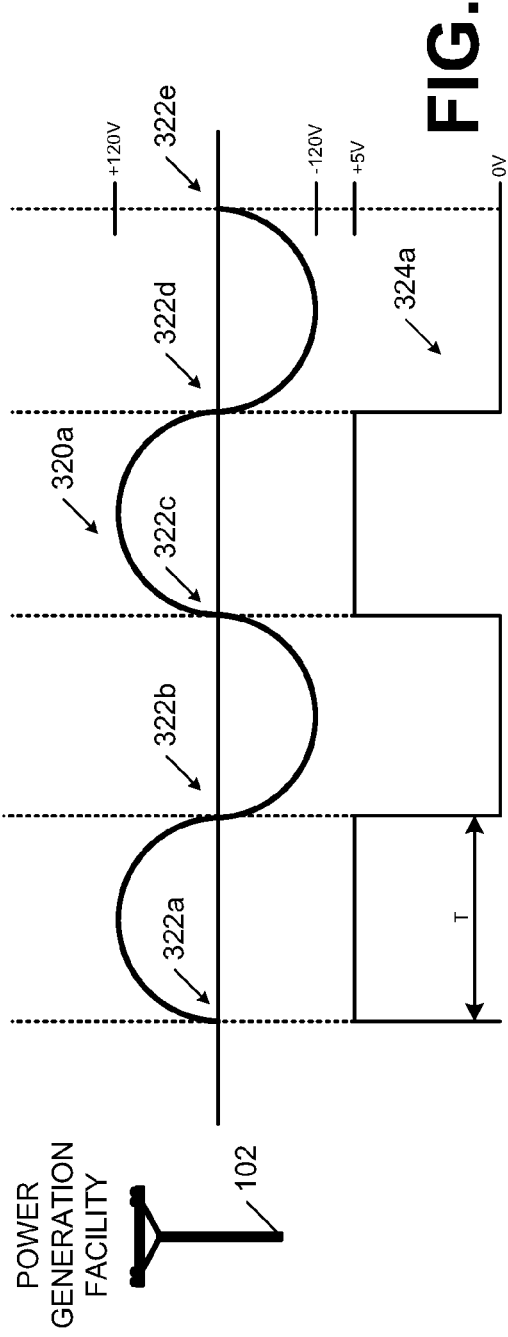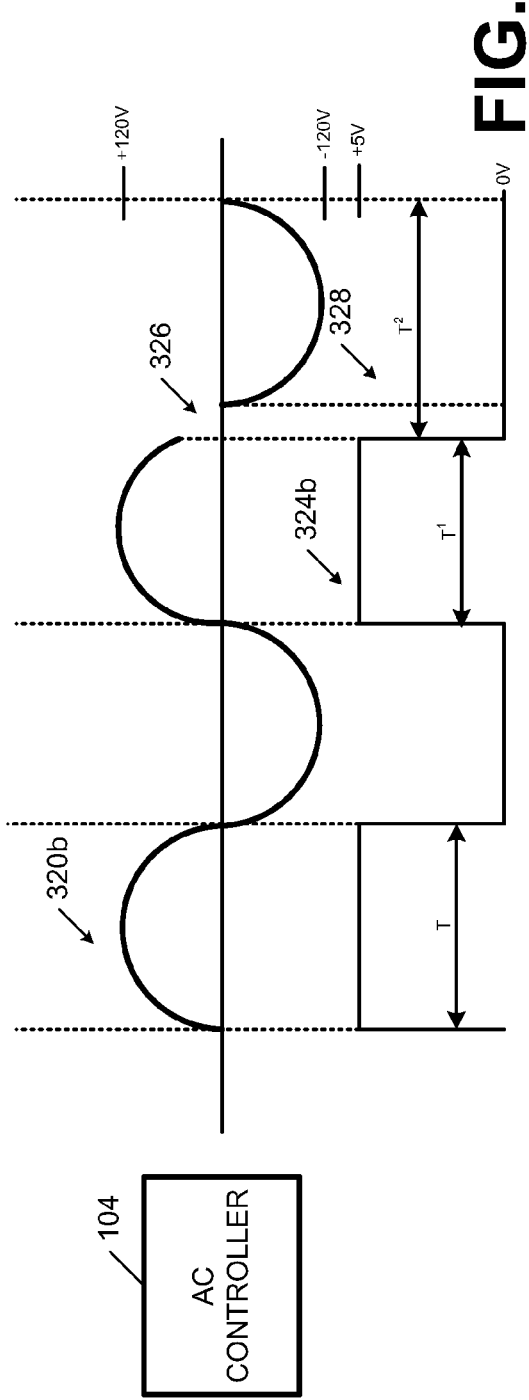

SYSTEMS AND METHODS FOR CUSTOMIZED LOAD CONTROL

CROSS REFERENCE

This application claims the benefit of U.S. Provisional Application Ser. No. 62/144,070, filed Apr. 7, 2015, which is hereby incorporated by reference in its entirety.

TECHNICAL FIELD

Embodiments described herein generally relate to systems and methods for customized lighting and communication via alternating current power and, more specifically, to providing a communication protocol and related hardware and software for customized lighting controls.

BACKGROUND

As lighting and power technologies have developed, there is now a desire to provide and/or utilize energy efficient electric and electronic devices. As an example, the lighting industry consumes a large amount of power and there is constantly pressure to reduce costs and reduce grid usage via more efficient lighting devices. Additionally, many current solutions produce a large amount of heat. It is also often difficult to adequately control lighting to provide the desired power consumption.

SUMMARY

Included are embodiments for customized load control. One embodiment of a method includes receiving altered alternating current power, where the altered alternating current power is altered via inclusion of a delay to communicate a message, converting the message in the altered alternating current power into a computer-readable format, and determining an action to take related to the message. Some embodiments include utilizing the altered alternating current power for performing the action, based on the message.

Embodiments of an electric device include an alternating current filter for filtering an altered alternating current power to create a filtered signal, a voltage current converter for utilizing the altered alternating current power to cause the load perform an action, and a load computing device that stores logic that, when executed by a processor, causes the electric device to receive the filtered signal from the alternating current filter. In some embodiments the logic causes the electric device to determine, from the filtered signal, a message included in the altered alternating current power, where the message is configured as a plurality of delays around respective zero cross points of the altered alternating current power. In some embodiments, the logic causes the electric device to determine, from the message, the action for the load to take, and communicate an instruction related to the action to the voltage current converter, where the voltage current converter utilizes the instruction to convert the altered alternating current power to implement the action.

Also included are embodiments of a system. The system may include a voltage current converter for utilizing an altered alternating current power to cause the load perform an action and a load computing device that stores logic that, when executed by a processor, causes the electric device to receive the altered alternating current power, where the altered alternating current power includes a message that is transmitted at the same frequency as the altered alternating current power, wherein the message is configured a delay around a zero cross point of the altered alternating current power. In some embodiments, the logic further causes the system to determine, from the message, the action for the load to take and communicate an instruction related to the action to the voltage current converter, where the voltage current converter utilizes the instruction to convert the altered alternating current power for the load to implement the action.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIGS. 1A-1B depict a power and communications network, according to embodiments described herein;

FIGS. 3A-3B depict waveforms of AC power that may be altered by the AC controller, as described herein;

DETAILED DESCRIPTION

Figure 2:
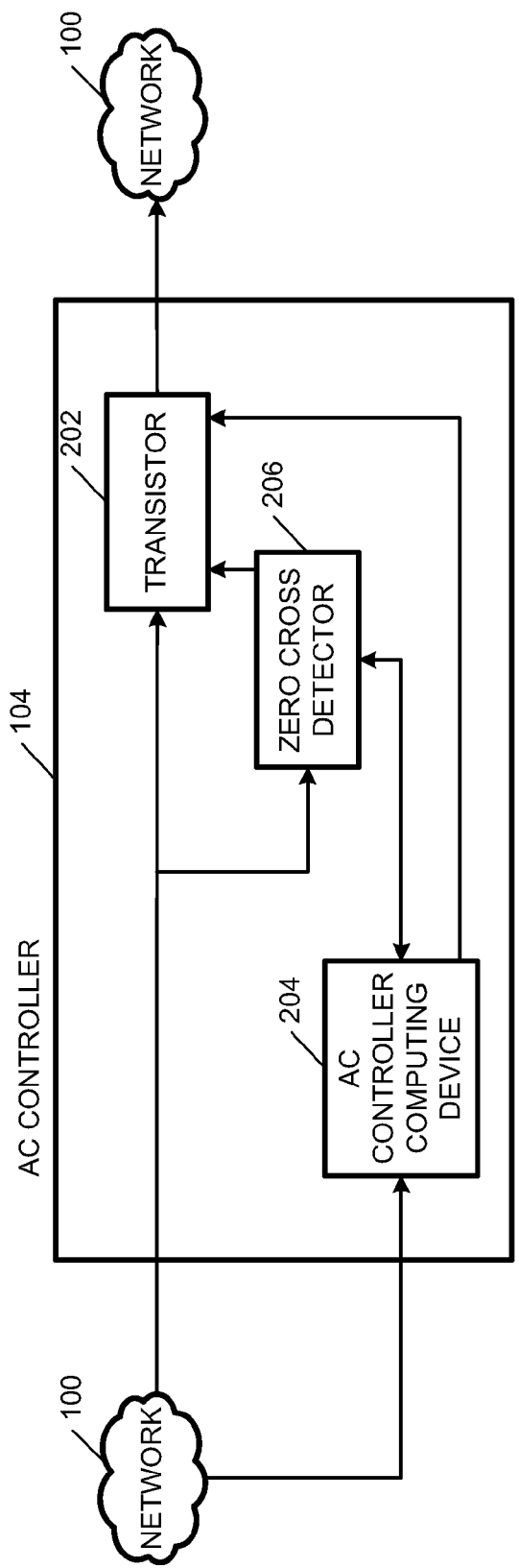
FIG. 2 depicts an alternating current (AC) controller, according to embodiments described herein.

Embodiments disclosed herein include systems and methods for customized lighting and communication via alternating current. Some embodiments may be configured to facilitate communication of data from a first device to a second device via a protocol that includes creating an altered alternating current power via alteration of an AC power waveform, where the communication is made in the same frequency as a predetermined frequency of the AC power. Additionally, some embodiments may provide for LED lighting without the need for a heat sink or other heat removal devices. Specifically, some embodiments may utilize an aluminum substrate on one or more portions of the device that provides integrated heat removal. Similarly, some embodiments may be configured to provide control of a load, such as one or more lighting devices via a communications network, such as the Internet. These and other embodiments incorporating the same will be described in more detail, below.

Referring now to the drawings, FIGS. 1A-1B depict a power and communications environment, according to embodiments described herein. As illustrated in FIG. 1A, the power and communications environment may include a network 100, which is coupled to an power generation facility 102, an alternating current (AC) controller 104, a lighting device 106, and a remote computing device 108. The network 100 may include a power network, which may include alternating current power that is delivered to a plurality of devices (or loads). The network 100 may also include a communications network, such as a wide area network, (e.g., the Internet, a cellular network, a telephone network, etc.) and/or a local area network (e.g. an Ethernet network, a wireless fidelity network, a near field communications network, etc.). As will be understood, the network 100 between any two devices may include a single wire or communication link and may include a plurality of power and/or communications channels.

The power generation facility 102 is also included in the embodiments of FIGS. 1A and 1B and may include a power plant, a solar power generation network, power storage facility and/or other facility that facilitates the providing of power to one or more devices. As will be understood, the power generation facility 102 may be configured to create and/or provide alternating current (AC) power. It should be understood that while the power generation facility 102 described herein may create the AC power, some embodiments may include separate entities and/or facilities for creating, storing, and transmitting the AC power to the devices, which are all included in the power generation facility 102 for simplicity.

Also included in FIGS. 1A and 1B is the AC controller 104. The AC controller 104 may be configured to receive the AC power, as well as a communication signal. As described in more detail below, the AC controller 104 may additionally alter the AC power signal on the same frequency that the AC power was received to include a message into the AC power.

The lighting device 106 may operate in concert with or separate from the AC controller 104 and may be configured to receive AC power from the power generation facility 102 for performing a function (such as illuminating a light emitting diode (LED)). The lighting device 106 may additionally receive a message via the AC controller 104, which may alter the function of the lighting device 106, facilitate monitoring of a function of the lighting device 106, and/or perform other actions.

It should be understood that while the lighting device 106 is described herein as an LED illumination device; this is merely an example. While embodiments described herein relate to illumination, this description may extend to other electric or electronic devices. Accordingly, any load may be attached to the hardware and/or software described herein to provide the desired functionality.

Also included in FIG. 1A is a remote computing device 108. The remote computing device 108 may represent one or more computing devices that may facilitate sending messages and/or commands to be included in AC power. The remote computing device 108 may also be configured for updating software and/or firmware associated with the components, and/or provide other functionality. As an example, some embodiments may be configured to receive a command form the remote computing device 108 to activate the lighting device 106. This command may be sent via a communications network (which is part of the network 100) to the AC controller 104, which may convert the message to be communicated via an altered from of the AC power. The AC power may be received by the lighting device 106, which may also receive the message. The lighting device 106 may thus be powered by the AC power and receive communications via the AC power.

FIG. 1B depicts a different configuration than FIG. 1A in that the embodiment of FIG. 1B illustrates the AC controller 104 with an electric circuit panel 110, such as a breaker panel, which may or may not be co-located with the AC controller 104. Specifically, the embodiment of FIG. 1B depicts the power generation facility 102, which is connected to the network 100. The power generation facility 102 may provide power to a user's facility, which may be received at the electric circuit panel 110 controlling operation and/or for distribution along a local portion of the network 100 to various loads at the user's facility. However, the AC controller 104 may be included with the electric circuit panel 110 and/or provided at the user premises and coupled to the electric circuit panel 110 via a local network to provide user control of the desired functionality. Depending on the particular embodiment, the AC controller 104 may be included in series between the power generation facility 102 and the electric circuit panel 110. However, some embodiments may be configured with the electric circuit panel 110 between the power generation facility 102 and the AC controller 104. Other configurations may also be utilized, depending on the embodiment. Regardless, the lighting device 106 may be coupled to the circuit for receiving power from the power generation facility 102.

FIG. 2 depicts an AC controller 104, according to embodiments described herein. As illustrated, the AC controller 104 may include a transistor 202, an AC controller computing device 204, and a zero cross detector 206. Specifically, the AC controller 104 may receive AC power from the power generation facility 102 at the transistor 202 and the zero cross detector 206. The AC controller 104 may also receive a communication signal such as from the remote computing device 108 at the AC controller computing device 204. The AC controller computing device 204 may determine a message that was sent via the communication signal and may determine an action to take from the communication signal. As an example, the communication signal may request that the lighting device 106 be turned off. Accordingly, the AC controller computing device 204 may determine this request and then determine how to alter the AC power that is received by the transistor 202 may be altered to communicate that message over the same frequency as the AC power.

In order to communicate the communication signal over the AC power, the AC controller computing device 204 may determine a communications protocol. As an example, the communications protocol may include delaying transmission and/or inserting a standard delay time at predetermined intervals in the AC power. Depending on the timing of the plurality of delays, a recipient device may decode the communication. As another example, the AC controller computing device 204 may determine the length of delay for communicating the message. In this scenario, length of delay and timing of subsequent delays may provide the communications protocol for the recipient device to decode. Based on the determined communications protocol that is being used, the zero cross detector 206 may determine when the AC power is transmitting zero volts (e.g., when the voltage from the AC power changes from positive to negative or vice versa). At or around the zero cross point (e.g., a point where the AC power crosses zero volts, either from positive to negative or from negative to positive), the AC controller computing device 204 may insert an alteration into the AC power, such as a delay. The alteration may occur at or around one or more zero cross points of the AC power and may be configured as a binary signal, such that a delayed zero cross point indicates a binary "1" and a non-delayed zero cross point indicates a binary "0." Other formats and protocols may be used as well, such as different lengths of delay to indicate different characters of a message. The transistor 202 may then implement the desired alteration to the AC power, which is sent along the network 100.

FIGS. 3A-3B depict waveforms of AC power that may be altered by the AC controller 104, as described herein. Specifically, FIG. 3A depicts a waveform 320a of AC power for providing power to one or more devices. The AC power may be transmitted with a peak voltage of plus/minus 120 volts, 220 volts, 440 volts, and/or other voltages. Accordingly, between the positive and negative peaks are zero cross points 322a-322d, where the voltage is zero.

Also depicted in FIG. 3A is a square wave 324a, with a voltage range of 0 volts to 5 volts. As described in more detail with regard to FIG. 4, the square wave may be created from the AC power via an AC filter 414 (FIG. 4) such that the load computing device 412 (FIG. 4) may be adequately powered. As will be understood, the voltage range of the square wave 324a may vary, depending on the requirements and specifications of the load computing device 412.

FIG. 3B depicts a waveform 320b of AC power that has been altered to communicate a message, as described herein. Specifically, the waveform 320b may be similar to the waveform 320a, except altered to communicate the message. Accordingly, the waveform 320b may have predetermined positive and negative voltages, as well as zero cross points corresponding with the waveform 320a. Additionally, the waveform 320b may have a predetermined half period (represented as "T"), which also corresponds to the waveform 320a. Upon determining the substance of a message to be sent, the AC controller 104 may be configured to delay transmission of the AC power at or around one or more zero cross points 322 for a predetermined time period before continuing the transmission. As illustrated in FIG. 3B, the delay 326 may be implemented, such that the half period for a first portion of the waveform 230b ($T^1$) may be the same as (or similar to) as the normal half period (T) because the delay began at the zero cross point corresponding with the zero cross point 322a from FIG. 3A. However, because of the implemented delay, the waveform 320b may be shifted by a predetermined amount of time and thus the half period of the subsequent portion of the waveform ($T^2$) may be greater by that delayed amount of time.

Accordingly, a recipient device (such as the lighting device 106) may receive the AC power and may recognize the alteration to the AC power. Depending on the protocol being implemented, the recipient device may decode the message and react appropriately. In some embodiments, a delayed waveform at an expected zero cross point will be identified as a binary "1," while an unaltered zero cross point of the AC power may represent a binary "0" (or vice versa). Thus, the recipient device may decode the series of binary "ones" and "zeros" to determine a message being sent via the AC power. Other embodiments may utilize a different encoding protocol, such as varying the length of delay to indicate a "1" or "0" or other data (e.g., a first amount of delay may indicate a first signal such as a "1" and a second amount of delay may represent a second signal such as a "0" and/or other coding protocol).

It should be understood that while embodiments described herein are not required to provide a delay at or around the zero cross point, the embodiments that insert delays at, around, and/or slightly after the zero cross point may (depending on the length of delay and the load) result in a more constant output of the load, as the voltage will experience less interruption. It should also be understood that, while the above description indicates that a delay is utilized, this is also an example. As described in FIG. 3B, the AC power may actually be disconnected, creating a break in power signal. Thus, the break may actually be represented as a zero voltage event. Other alterations may also be utilized.

FIG. 3B also depicts a square wave 324b, with a corresponding delay 328. As the AC controller 104 may alter the AC power, the square wave may experience a similar delay, which may also be utilized to communicate data.

Figure 4:
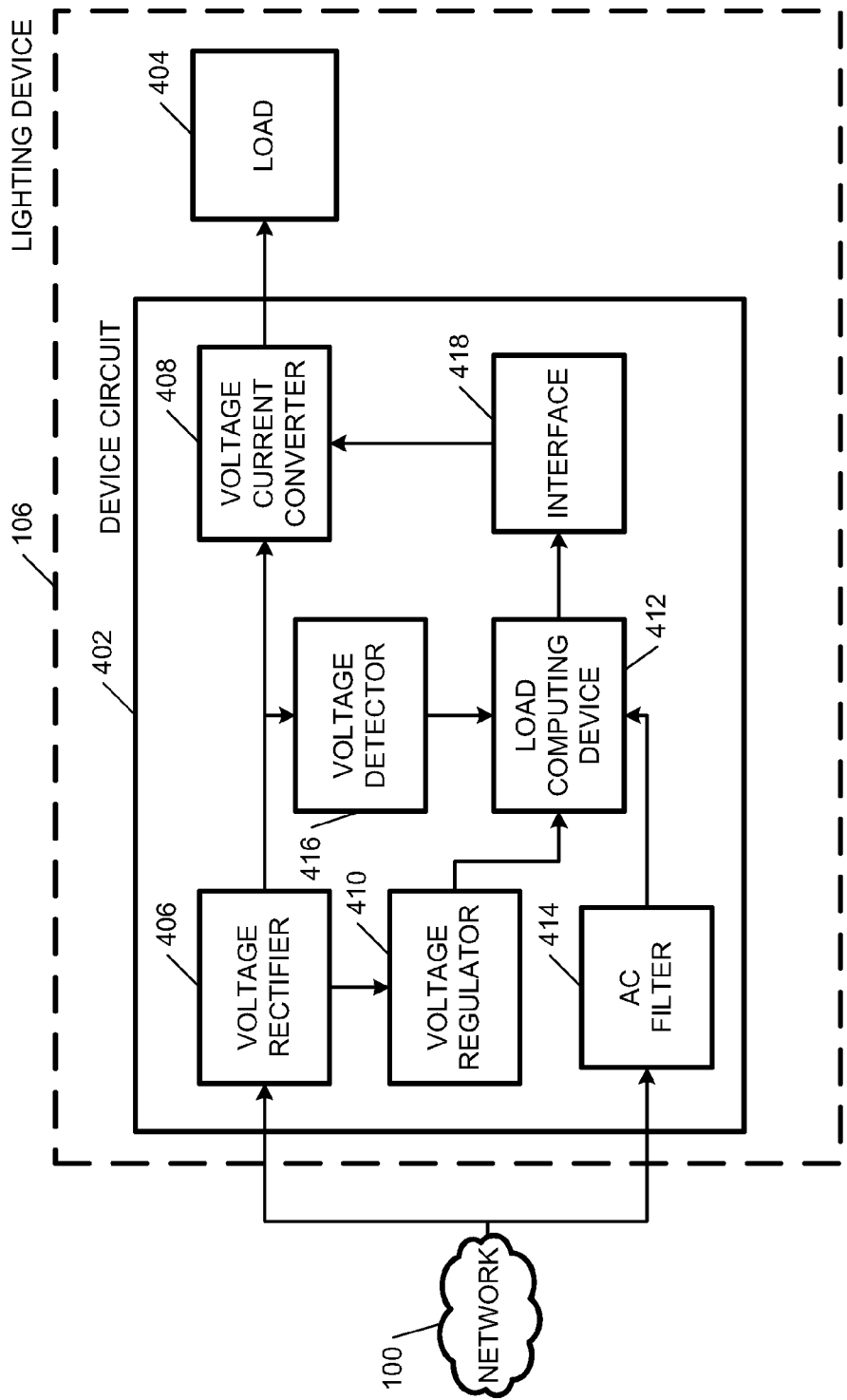
FIG. 4 depicts a lighting device, according to embodiments described herein.

FIG. 4 depicts an electric device that takes the form of a lighting device 106, according to embodiments described herein. As illustrated, the lighting device 106 includes a device circuit 402 and a load 404. The device circuit 402 may include a voltage rectifier 406, a voltage current converter 408, a voltage regulator 410, a load computing device 412, an AC filter 414, and an interface component 418. Specifically, the AC power (or the altered AC power, depending on the embodiment) may be received by the device circuit 402 at the voltage rectifier 406. The voltage rectifier 406 may be configured to modify the AC power (waveform 320a or 320b from FIG. 3A, 3B) to rectify or remove negative portions of the waveform and/or otherwise convert the AC power into direct current (DC) power. As an example, the load 404 may be configured to only activate with positive voltage. Accordingly, if the load 404 receives AC power, the LEDs may flicker due to the negative voltage being received. This may result in a potentially undesirable output. As such, the voltage rectifier 406 may be configured to output only non-negative voltage to provide a steady output from the load 404.

The voltage rectifier 406 may send the conditioned voltage to the voltage current converter 408, as well as to the voltage regulator 410. The voltage regulator 410 may be configured to reduce the voltage of the rectified power to a level that is usable to power the load computing device 412. As an example, the voltage regulator 410 may reduce the DC voltage to about 5 volts or other voltage that is usable by the load computing device 412. This converted DC voltage may be sent to power the load computing device 412.

The load computing device 412 may also be coupled to the voltage detector 416 and may be configured to alter the manner in which voltage is delivered to the load 404. Similarly, some embodiments of the load computing device 412 may be configured to receive AC power that includes communication data; decode that communication; and perform an action, based on the decoded message.

To this end, the voltage detector 416 may receive the conditioned voltage from the voltage rectifier 406 and may determine a characteristic of the AC power. Based on the characteristic, the load computing device 412 may send a communication to the interface component 418, which acts as a barrier between high and low voltages. The interface component 418 may send a signal to the voltage current converter 408, which may alter the voltage received by various portions of the load 404, based on the message received in the AC power and decoded by the load computing device 412.

Additionally, the AC power (with the alterations described in FIG. 3B) may be received by the AC filter 414. As described above regarding FIGS. 3A and 3B, the AC filter 414 may receive the AC power and convert the AC power into a filtered signal, which may include computer-readable format, such as a square wave with a peak voltage that is compatible with the load computing device 412. If the AC controller 104 (FIGS. 1A, 1B, and 2) alters the AC power (such as including a delay), the square wave produced by the AC filter 414 may also include the alteration (or similar alteration). The load computing device 412 may receive the square wave from the AC filter 414 and may utilize logic to determine the message included in the altered square wave. Depending on the particular embodiment, the message sent via the AC power may include an instruction to activate the load 404, deactivate the load 404, reduce power to the load, etc. Some embodiments may be configured to cause the load computing device 412 to implement a test sequence for testing operation of the lighting device 106. Similarly, some embodiments may cause the load to communicate a message to another device (such as a mobile phone, television, computing device, etc.).

As an example, some embodiments may be configured such that the load is an array of light emitting diodes (LEDs). Based on the received voltage of the AC power, the load computing device 412 may cause the voltage current converter 408 to send the AC power only to those LEDs that can properly operate under the power constraints, thus changing output of the LEDs. This can provide relatively consistent output of the load 404, regardless of the AC power.

It should also be understood that embodiments of the device circuit 402 may be provided on a printed circuit board (PCB) and/or other circuit material that includes an aluminum substrate as a primary component. By utilizing an aluminum substrate for the device circuit 402, heat may be dissipated, thus removing the necessity for a heat sink or other heat removal devices.

Additionally, while the embodiment of FIG. 4 depicts a single device circuit 402 and a single load 404, this is also merely an example. Some embodiments may couple a plurality of loads 404 to a single device circuit 402 and/or a plurality of device circuits 402 together to provide the desired functionality and/or illumination. Additionally, the blocks 202-206 depicted in FIG. 2 and blocks 406-418 from FIG. 4 may be implemented in hardware (including programmable hardware), software, and/or firmware depending on the particular embodiment, so long as the desired functionality is provided. It should also be understood that while the lighting device 106 is depicted with both the device circuit 402 and the load 404, this is also an example. Some embodiments may include a device circuit that is separate from the lighting device 106.

Figure 5:
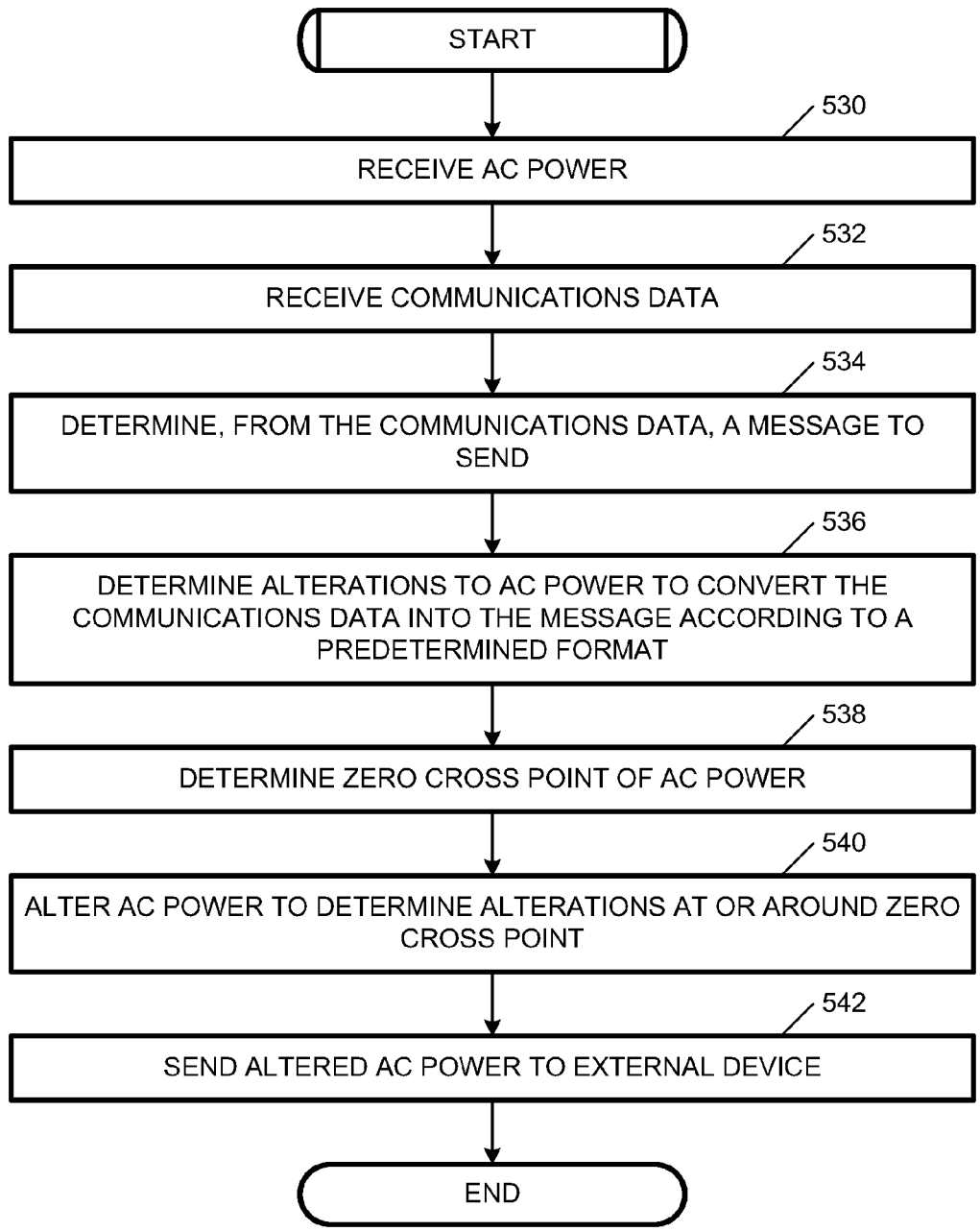
FIG. 5 depicts a flowchart for sending altered AC power to a device, according to embodiments described herein.

FIG. 5 depicts a flowchart for sending altered AC power to a device, according to embodiments described herein. As illustrated in block 530, AC power may be received. In block 532, communication data may be received. As discussed above, the communication data may be received from a remote computing device 108 and/or via other source. Regardless, in block 534, a message for sending to a remote device may be determined from the communication data. In block 536, alterations to the AC power may be determined to convert the communications data into the message according to a predetermined format. In block 538, a zero cross point of the AC power may be determined. In block 540, the AC power may be altered to determine alterations at or around the zero cross point. In block 542, the altered AC power may be sent to an external device.

Figure 6:
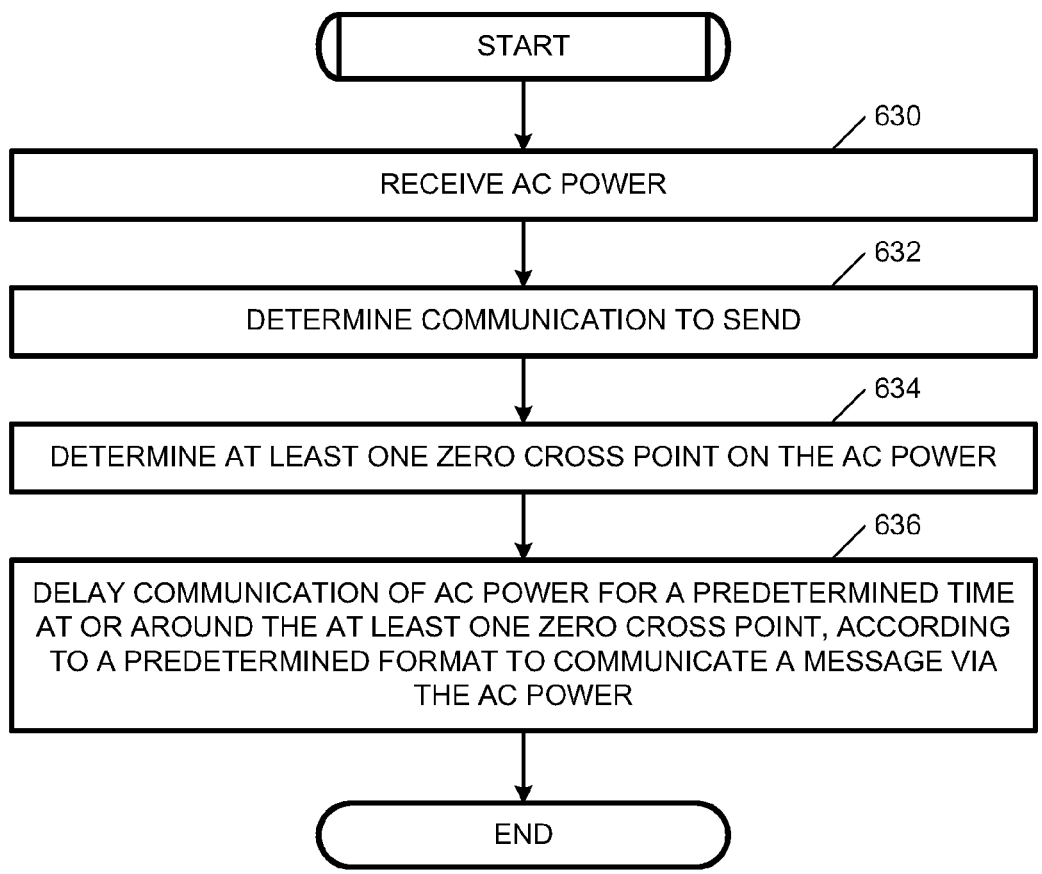
FIG. 6 depicts a flowchart for including a delay in AC power for sending a message, according to embodiments described herein.

FIG. 6 depicts a flowchart for including a delay in AC power for sending a message, according to embodiments described herein. As illustrated in block 630, AC power may be received. In block 632, a communication to send may be determined. In block 634, at least one zero cross point of the AC power may be determined. In block 636, communication of the AC power may be delayed for a predetermined time at or around the at least one zero cross point, according to a predetermined format to communicate a message via the AC power.

Figure 7:
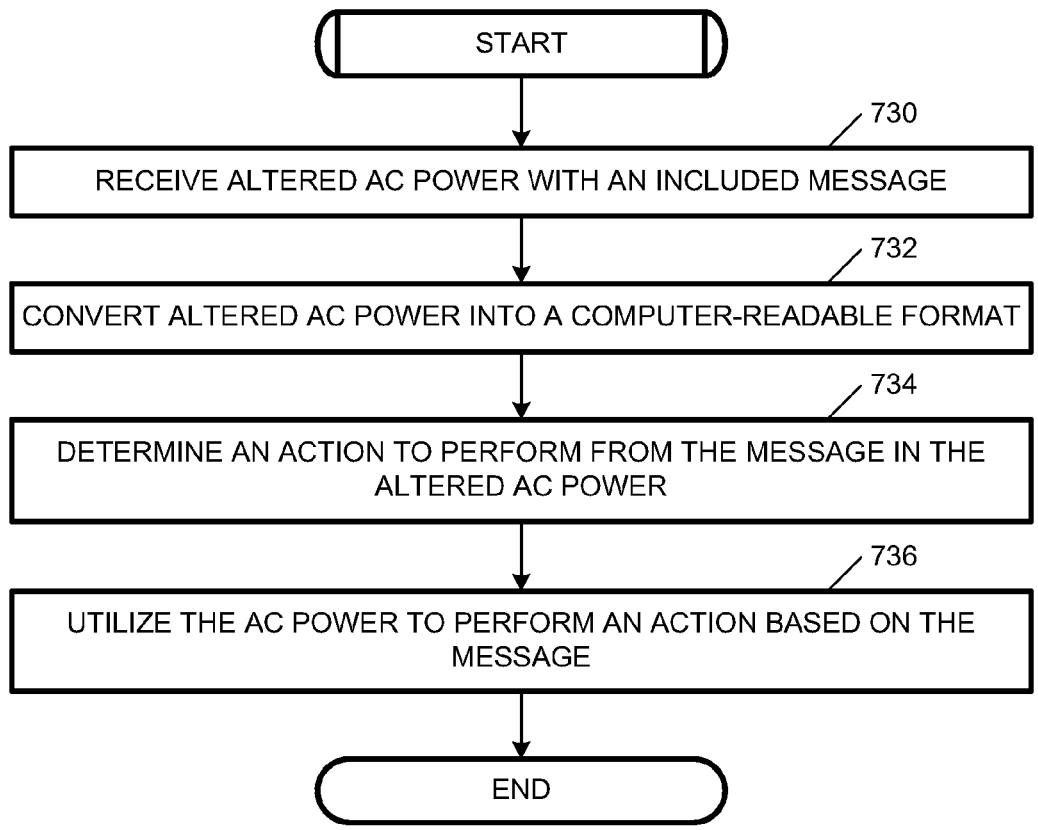
FIG. 7 depicts a flowchart for determining contents of a message that was sent via altered AC power, according to embodiments described herein.

FIG. 7 depicts a flowchart for determining contents of a message that was sent via altered AC power, according to embodiments described herein. As illustrated in block 730, altered AC power may be received with an included message. In block 732, the altered AC power may be converted into a computer-readable format. In block 734, an action may be determined from the message in the altered AC power. In block 736, the AC power may be utilized to perform the action, according to the determined message.

Figure 8:
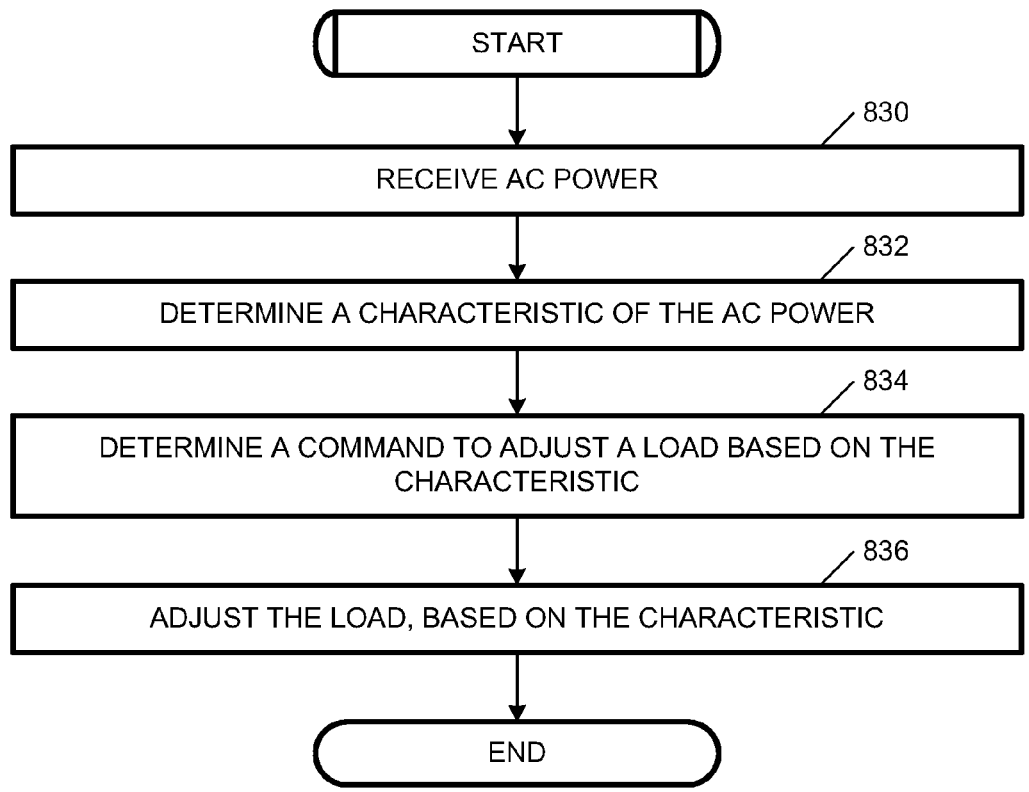
FIG. 8 depicts a flowchart for altering a load, based on a determined characteristic of received AC power, according to embodiments described herein.

FIG. 8 depicts a flowchart for altering a load, based on a determined characteristic of received AC power, according to embodiments described herein. As illustrated in block 830, AC power may be received. In block 832, a characteristic of the AC power may be determined. In block 834, a command to adjust a load based on the characteristic may be determined. In block 836, the load may be adjusted, based on the characteristic.

Figure 9:
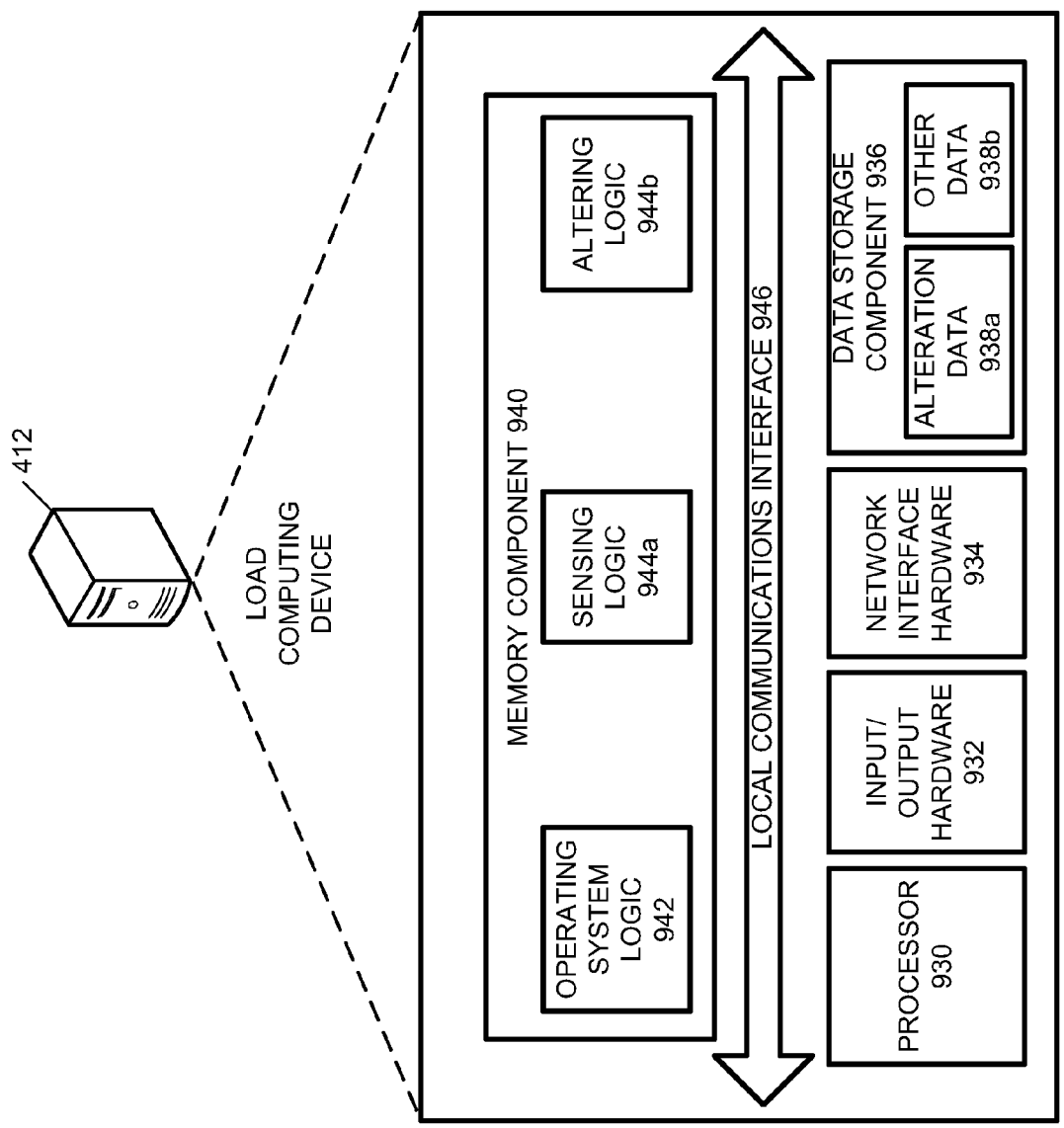
FIG. 9 depicts a load computing device for determining a characteristic of AC power, according to embodiments described herein.

FIG. 9 depicts a load computing device 412 for determining a characteristic of AC power, according to embodiments described herein. The load computing device 412 includes a processor 930, input/output hardware 932, network interface hardware 934, a data storage component 936 (which stores alteration data 938a, other data 936b, and/or other data), and the memory component 940. The memory component 940 may be configured as volatile and/or non-volatile memory and as such, may include random access memory (including SRAM, DRAM, and/or other types of RAM), flash memory, electrical erasable programmed read only memory (EEPROM), secure digital (SD) memory, registers, compact discs (CD), digital versatile discs (DVD), and/or other types of non-transitory computer-readable mediums. Depending on the particular embodiment, these non-transitory computer-readable mediums may reside within the load computing device 412 and/or external to the load computing device 412.

The memory component 140 may store operating system logic 942, sensing logic 944a and altering logic 144b. The sensing logic 944a and the altering logic 944b may each include a plurality of different pieces of logic, each of which may be embodied as a computer program, firmware, and/or hardware, as an example. A local interface 946 is also included in FIG. 9 and may be implemented as a bus or other communication interface to facilitate communication among the components of the load computing device 412.

The processor 930 may include any processing component operable to receive and execute instructions (such as from a data storage component 936 and/or the memory component 140). As described above, the input/output hardware 932 may include and/or be configured to interface with the components of FIG. 9.

The network interface hardware 934 may include and/or be configured for communicating with any wired or wireless networking hardware, including an antenna, a modem, a LAN port, wireless fidelity (Wi-Fi) card, WiMax card, mobile communications hardware, and/or other hardware for communicating with other networks and/or devices. From this connection, communication may be facilitated between the load computing device 412 and other computing devices, such as those depicted in FIG. 1.

The operating system logic 942 may include an operating system and/or other software for managing components of the load computing device 412. As discussed above, the sensing logic 944a may reside in the memory component 940 and may be configured to cause the processor 930 to determine voltage values, delays in power signal waveforms, as well as perform other functions, as described above. Similarly, the altering logic 944b may be utilized to provide instructions for altering one or more functions of the lighting device 106.

It should be understood that while the components in FIG. 9 are illustrated as residing within the load computing device 412, this is merely an example. In some embodiments, one or more of the components may reside external to the load computing device 412. It should also be understood that, while the load computing device 412 is illustrated as a single device, this is also merely an example. Similarly, some embodiments may be configured with the sensing logic 944a and the altering logic 944b residing on different computing devices. Additionally, while the load computing device 412 is illustrated with the sensing logic 944a and the altering logic 944b as separate logical components, this is also an example. In some embodiments, a single piece of logic may cause the remote computing device 108 to provide the described functionality or multiple different pieces may provide this functionality.

It should also be understood that while the load computing device 412 is depicted in FIG. 9, other computing devices, such as the AC controller computing device 204 and the remote computing device 108 may also include at least a portion of the hardware described with regard to FIG. 9. The hardware and software for these devices however, may vary from those described with regard to FIG. 9 to provide the desired functionality.

As illustrated above, various embodiments for customized lighting and communication via alternating current power are disclosed. These embodiments may be configured to provide a user to with the ability to control output of a load (such as a lighting device) with a remote computing device. Embodiments also provide for circuitry that does not require heat removal devices. Some embodiments may also provide the ability to communicate over AC power using the same frequency as the AC power.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

What is claimed is:

1. An electric device for customized load control comprising:
    an alternating current filter for filtering an altered alternating current power to create a filtered signal;
    a voltage current converter for utilizing the altered alternating current power to cause the load perform an action; and
    a load computing device that stores logic that, when executed by a processor, causes the electric device to perform at least the following:
    receive the filtered signal from the alternating current filter;
    determine, from the filtered signal, a message included in the altered alternating current power, wherein the message is configured as a plurality of delays around respective zero cross points of the altered alternating current power;
    determine, from the message, the action for the load to take;
    communicate an instruction related to the action to the voltage current converter, wherein the voltage current converter utilizes the instruction to convert the altered alternating current power to implement the action.

2. The electric device of claim 1, wherein the alternating current filter further transforms the altered alternating current power into a square wave, wherein the square wave includes the plurality of delays.

3. The electric device of claim 1, further comprising a voltage rectifier that receives the altered alternating current power and removes negative voltage from the altered alternating current power.

4. The electric device of claim 1, further comprising a voltage detector that receives the altered alternating current power, determines a characteristic of the altered alternating current power, and communicates data related to the characteristic to the load computing device.

5. The electric device of claim 1, further comprising an interface for formatting data communicated from the load computing device to the voltage current converter.

6. The electric device of claim 1, further comprising the load, wherein the load includes a lighting device.

7. The electric device of claim 1, wherein the action includes at least one of the following: changing output of the load, and cause the load to communicate with another device.

8. A system for customized load control that includes an electric device and the load, the electric device comprising:
    a voltage current converter for utilizing an altered alternating current power to cause the load perform an action; and
    a load computing device that stores logic that, when executed by a processor, causes the electric device to perform at least the following:
    receive the altered alternating current power, wherein the altered alternating current power includes a message that is transmitted at the same frequency as the altered alternating current power, wherein the message is configured a delay around a zero cross point of the altered alternating current power;
    determine, from the message, the action for the load to take;
    communicate an instruction related to the action to the voltage current converter, wherein the voltage current converter utilizes the instruction to convert the altered alternating current power for the load to implement the action.

9. The system of claim 8, further comprising an alternating current filter, wherein the alternating current filter transforms the altered alternating current power into a square wave, wherein the square wave includes the delay.

10. The system of claim 8, further comprising a voltage rectifier that receives the altered alternating current power and removes negative voltage from the altered alternating current power.

11. The system of claim 8, further comprising a voltage detector that receives the altered alternating current power, determines a characteristic of the altered alternating current power, and communicates data related to the characteristic to the load computing device.

12. The system of claim 8, further comprising an interface for formatting data communicated from the load computing device to the voltage current converter.

13. The system of claim 8, further comprising an electric circuit panel co-located with the electric device.

14. The system of claim 8, further comprising an alternating current controller that alters alternating current power to include the message.

* * * * *